UNITED STATES PATENT OFFICE.

BERNHARD JACQUES FLÜRSCHEIM, OF FLEET, ENGLAND.

PROCESS FOR THE REDUCTION OF META-NITRO DERIVATIVES OF HYDROCARBONS OF THE BENZENE SERIES.

1,074,545.  Specification of Letters Patent.  Patented Sept. 30, 1913.

No Drawing.  Application filed March 25, 1912.  Serial No. 686,123.

*To all whom it may concern:*

Be it known that I, BERNHARD JACQUES FLÜRSCHEIM, doctor of philosophy and research chemist, a subject of the King of the British Dominions, residing at Fleet, Hampshire, England, have invented certain new and useful Improvements in Processes for the Reduction of Meta-Nitro Derivatives of Hydrocarbons of the Benzene Series, of which the following is a specification.

The reduction of meta-dinitro derivatives of aromatic hydrocarbons to the corresponding meta-nitro-amino derivative has already been effected by means of sulfids of the alkali-group. As the above mentioned dinitro compounds are almost insoluble in water, these reductions have hitherto been carried out in an organic solvent, usually in alcohol.

A general suggestion has been made (Lassar-Cohn, *Arbeitsmethoden*, 3rd edition, page 1022) that it should be possible to achieve partial reduction of a poly-nitro derivative by boiling it, in the presence of an excess of alkali, with an aqueous solution of the calculated amount of sodium-sulfid, until the liquid ceases to give a hydrogen sulfid reaction. While possibly applicable to soluble poly-nitro compounds, such as picric acid, this method fails in the case of dinitro-benzene and its homologues, the chief product of the reaction being, not a nitro-anilin, but a diamino-benzene. I have, however, found that an excellent yield of the meta-nitro-amino derivative can be obtained, without the use of an organic solvent, if the aqueous suspension of the corresponding dinitro compound is heated and well stirred—for instance by boiling it—not with the whole calculated amount all together of the sulfid, as suggested by Lassar-Cohn, but only with a small portion of the calculated amount of sulfid at a time. Under the name of sulfid I wish to include any mono-sulfid, bisulfid, polysulfid and sulf-hydrate capable of being oxidized in aqueous solution by means of a nitro group, such as an alkali-sulfid (for instance sodium sulfid), ammonium sulfid or a sulfid of the earth-alkali group (such as calcium-bisulfid). In each case free sulfur may be added.

Example: 10 parts of sulfur are dissolved in 75 parts of crystallized sodium sulfid (or 40 parts of 60% concentrated solid sodium sulfid) and some water, the solution is then diluted with water to a total volume of 190 parts and gradually added, at a constant rate and within 1½ hours to a suspension of 50 parts of commercial dinitro-benzene in 200 parts of boiling water. After cooling, the liquid is separated from the solid residue and yields sodium thio-sulfate after evaporation. The solid residue contains the meta-nitro-anilin, which may either be used directly or first purified, for instance by recrystallization from water, or by extracting it by means of an acid.

By this new process the use of an organic solvent is rendered unnecessary, and thereby also the unavoidable loss and expense connected with the recovery of that solvent; on the other hand, very little diamin being formed, the yield is approximately the same as that obtained with an organic solvent.

What I claim is—

1. The process for the reduction of a meta-dinitro derivative of a hydrocarbon of the benzene series, which consists in gradually introducing a sulfid into a heated mixture of the said hydrocarbon derivative with water, substantially as described.

2. The process for the reduction of a meta-dinitro derivative of a hydrocarbon of the benzene series, which consists in gradually introducing a sulfid and sulfur into a heated mixture of the said hydrocarbon derivative with water, substantially as described.

3. The process for the reduction of a meta-dinitro derivative of a hydrocarbon of the benzene series, which consists in gradually introducing an aqueous solution of a sulfid into a heated mixture of the said hydrocarbon derivative with water, substantially as described.

4. The process for the reduction of a meta-dinitro derivative of a hydrocarbon of the benzene series, which consists in gradually introducing an alkali sulfid into a heated mixture of the said hydrocarbon derivative with water, substantially as described.

5. The process for the reduction of a meta-dinitro derivative of a hydrocarbon of the benzene series, which consists in gradually introducing an alkali sulfid and sulfur into a heated mixture of the said hydrocarbon derivative with water, substantially as described.

6. The process for the manufacture of a meta-nitro derivative of a hydrocarbon of the benzene series, which consists in gradually introducing an aqueous solution of an alkali-sulfid and sulfur into a heated suspension of the said hydrocarbon derivative in water, substantially as described.

7. The process for the manufacture of a meta-nitro-anilin, which consists in gradually adding to a heated mixture of the said hydrocarbon derivative with water an aqueous solution of sodium sulfid and sulfur, and separating the meta-nitro-anilin thus formed from the accompanying liquid, substantially as described.

In testimony whereof I have hereunto set my hand in presence of two subscribing witnesses.

BERNHARD JACQUES FLÜRSCHEIM.

Witnesses:
JASPER WETTER,
HENRY J. BROCKWELL.

Copies of this patent may be obtained for five cents each, by addressing the "Commissioner of Patents, Washington, D. C."